United States Patent Office 2,814,366
Patented Nov. 26, 1957

2,814,366

AUTOMATIC DEVICE FOR TAKING UP WEAR

René Lucien, Neuilly-sur-Seine, France, assignor to Societe a responsabilite limitee Recherches Etudes Production R. E. P., Paris, France, a corporation of France Application July 16, 1956, Serial No. 597,907

Claims priority, application France June 1, 1956

2 Claims. (Cl. 188—196)

The invention relates to a device for taking up wear in brake linings and in a more general manner, for taking up wear in all types of mechanisms which are operated hydraulically, pneumatically, or by other like means.

The device which forms a special feature of the invention, particularly enables an operating piston to advance, under the action of the pressure of the fluid applied between the said piston and the bottom of the cylinder, in the cylinder, to a greater extent as the driven member shows a greater degree of wear, but only permits its return travel by a limited amount when the pressure no longer acts on the piston. In a hydraulic disc brake for example, comprising a piston provided with a friction lining which acts on discs in rotation, the piston should move forward in the cylinder to a degree depending on the wear on the said lining, but should not be able to move back when the pressure is removed, except over a distance limited by the play necessary to release the braking effect.

The invention is especially characterised by the fact that, when the worn member or members—the lining in the case of a brake—should be replaced, this replacement may be effected and the device may be replaced in position in the same state as it was when new (before any wear took place), without any dismantling.

In accordance with the invention, the device comprises a member of revolution surrounding the piston, and having a section in the form of a U, the opening of which is turned towards the piston. This member is housed in the body of the cylinder with a longitudinal clearance equal to the play required for releasing the braking effect or the release of the mechanism to be controlled. Annular segments, of steel for example, the height of which is slightly greater than the distance between the bottom of the U-shaped member and the piston, are arranged in the U-shaped member and are inclined at an angle to the axis of the piston in the direction which permits the movement of the piston away from the bottom of the cylinder while on the contrary it opposes the movement of the piston in the reverse direction by the jamming action of the segments. The segments are retained in position by elastic means, for example by means of rubber washers housed in the U-shaped member. The device is completed by a chamfer executed on the external face of the piston and by a further chamfer with an oppositely-directed slope, in the cylindrical wall of the piston in the vicinity of its internal face.

There will be described below, by way of example and not in any sense of limitation, a device in accordance with the invention in its application to a lining of a disc brake. This device is illustrated by the attached drawings in which.

In these figures: P is the piston which is movable inside the cylinder C. It carries on its external face the brake lining G which is subject to wear and which acts on a brake disc (not shown).

At its front extremity, the cylinder is bored out to a diameter greater than that of the piston, in order to receive a U-shaped member of sheet steel having a section in the form of a U. Inside this member are housed the segments S, in this case four in number, which are retained therein, gripped between two rubber washers R. These segments have a transverse section of height $h$ which is slightly longer than the distance between the piston and the bottom of the U-shaped member when the latter is in position inside the large diameter bore of the cylinder.

Figure 1:
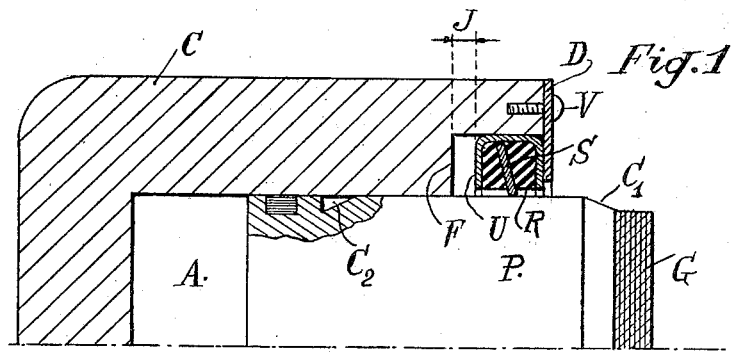
Fig. 1 is a cross-section taken along the axis of a brake cylinder.
Figure 2:
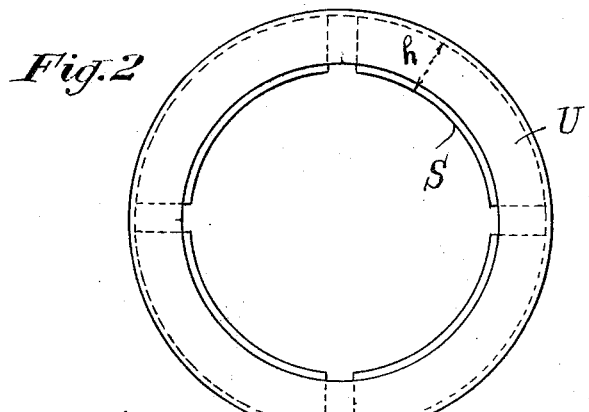
Fig. 2 is a plan view of the member having a U-shaped section.

The device is placed in position in the following manner:

The piston being inserted inside the cylinder, the U-shaped member, fitted as has been described above, is inserted at the end of the piston and this member is pushed forward in the direction of the cylinder. The segments S are then arranged slantwise as shown in Fig. 1, by reason of the slope of the chamfer $C_1$. The U-shaped member being then in its housing, the latter is closed by an annular disc D fixed in position by means of screws V.

As the chamber A is full of liquid, if pressure is admitted to the chamber, the piston is pushed outwards until the lining G applies a pressure against the brake disc. When the pressure is removed, the piston can move back, but only through a travel limited to the predetermined clearance J between the U-shaped member which it carries along with it through the medium of the segments S—and the bottom F of the housing of this member. A greater return movement of the piston is, in fact, prevented by the obliquity of the segments S.

Figure 3:
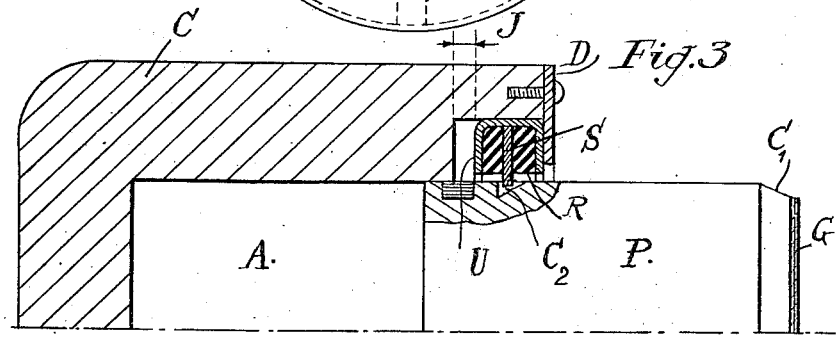
Fig. 3 and Fig. 4 are views similar to that shown in Fig. 1, for different positions of the piston.
Figure 4:
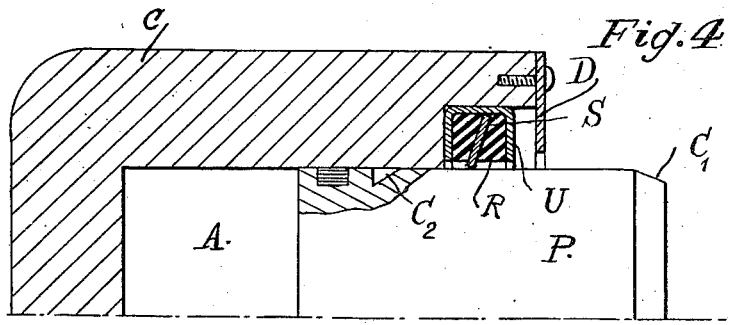

When the lining G has reached an amount of wear which requires it to be replaced, the piston has moved forward with respect to its initial braking position—that is to say before any wear of the lining took place—by a distance corresponding to the amount of the wear. In order to proceed to bring the piston back to its initial position, the operation is as follows: the piston is moved outwards until the internal edges of the segments S come into the chamfer $C_2$ (see Fig. 3). The piston can then be pushed back towards the bottom of the cylinder, but the segments take up a slope opposite to that which they had previously (see Fig. 4). This return movement of the piston is continued until the segments reach the chamfer $C_1$, which permits them to straighten up again. The replacement of the lining G is then carried out, and it is only necessary again to apply the pressure in the chamber A to restore the system to its initial condition, which is that shown in Fig. 1.

It will be understood that the present device for taking up wear may be applied to any mechanical transmission of motion from a hydraulic piston, of which one or a number of elements are subject to wear, the example of the hydraulic brake having been chosen simply because of its simplicity.

What I claim is:

1. A device for taking up wear in members such as friction linings in mechanisms subjected to the pressure of a fluid comprising: a pressure cylinder, a piston movable in the said cylinder; an annular chamber formed in the wall of the said cylinder at the entrance thereof and open in the direction of the piston, an annular member with a U-shaped section disposed in the said chamber, having its opening directed towards the said piston, in the said member, annular segments the section of which through an axial plane has a length greater than the distance between the bottom of the said U-shaped member and the wall of the piston, and is inclined at an angle to the generators of the said piston, the said segments being gripped inside the U-shaped member between elastic washers pressed against the sides of the said U-shaped member.

2. A device in accordance with claim 1, in which the extremity of the piston opposite to the bottom of the cylinder is provided with a chamfer, and in which, on the cylindrical portion of the said piston and in the vicinity of its rear face is formed a second chamfer, the slope of which is the reverse of that of the first said chamfer, and the maximum depth of which is at least equal to the length of the axial section of the said segments.

No references cited.